United States Patent
Bifulco et al.

(10) Patent No.: US 10,370,971 B2
(45) Date of Patent: Aug. 6, 2019

(54) REINFORCED GAS TURBINE ENGINE ROTOR DISK

(71) Applicant: UNITED TECHNOLOGIES CORPORATION, Farmington, CT (US)

(72) Inventors: Anthony R. Bifulco, Ellington, CT (US); Damon K. Brown, Middletown, CT (US); Nicholas Aiello, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 976 days.

(21) Appl. No.: 14/929,771

(22) Filed: Nov. 2, 2015

(65) Prior Publication Data

US 2016/0138399 A1 May 19, 2016

Related U.S. Application Data

(60) Provisional application No. 62/080,811, filed on Nov. 17, 2014.

(51) Int. Cl.
*F01D 5/02* (2006.01)
*F01D 5/06* (2006.01)
(Continued)

(52) U.S. Cl.
CPC .................. *F01D 5/02* (2013.01); *F01D 5/06* (2013.01); *F01D 5/34* (2013.01); *F02C 3/04* (2013.01);
(Continued)

(58) Field of Classification Search
CPC ... F01D 5/02; F01D 5/021; F01D 5/06; F01D 5/28; F05D 2240/20; F05D 2260/94; F05D 2260/30; F05D 2300/603
See application file for complete search history.

(56) References Cited

U.S. PATENT DOCUMENTS

| 4,191,510 A | 3/1980 | Teysseyre et al. |
| 4,397,609 A * | 8/1983 | Kochendorfer ......... F01D 5/021 416/204 A |

(Continued)

FOREIGN PATENT DOCUMENTS

| DE | 10163951 C1 | 12/2002 |
| EP | 1843044 A1 | 10/2007 |

(Continued)

OTHER PUBLICATIONS

English Abstract for DE10163951C1—Dec. 19, 2002.
(Continued)

*Primary Examiner* — Ninh H Nguyen
(74) *Attorney, Agent, or Firm* — Cantor Colburn LLP (57) ABSTRACT

A structurally-reinforced rotor disk for a gas turbine engine is disclosed. The rotor disk may comprise a body including a rim configured to support airfoils (which may be separate or integral with the airfoils), an axially-extending bore disposed radially inward of the rim, and a radially-extending web connecting the rim and the bore. The bore may include an axial outer edge and at least one circumferentially-extending annular recess formed axially between the outer edge and the web. The rotor disk may further comprise an annular ring retained in the annular recess, and the annular ring may be formed from a different material than the body of the rotor disk so as to increase a self-sustaining radius of the rotor disk.

20 Claims, 5 Drawing Sheets

(51) Int. Cl.
 *F01D 5/34* (2006.01)
 *F02C 3/04* (2006.01)

(52) U.S. Cl.
 CPC ...... *F05D 2220/32* (2013.01); *F05D 2230/31* (2013.01); *F05D 2230/60* (2013.01); *F05D 2240/20* (2013.01); *F05D 2240/35* (2013.01); *F05D 2300/224* (2013.01); *F05D 2300/48* (2013.01); *F05D 2300/603* (2013.01); *F05D 2300/6032* (2013.01); *F05D 2300/614* (2013.01); *Y02T 50/672* (2013.01)

(56) References Cited

U.S. PATENT DOCUMENTS

| | | | | |
|---|---|---|---|---|
| 5,400,505 | A | * | 3/1995 | Wei ............................ B22F 3/15 29/460 |
| 5,470,524 | A | * | 11/1995 | Krueger ................. B22F 5/009 419/10 |
| 5,941,688 | A | | 8/1999 | Dambrine |
| 6,213,720 | B1 | | 4/2001 | Farmer |
| 7,011,490 | B2 | | 3/2006 | Albrecht et al. |
| 7,811,062 | B1 | | 10/2010 | Twigg |
| 8,123,487 | B2 | | 2/2012 | Bayer et al. |
| 2007/0231144 | A1 | | 10/2007 | Schreiber |
| 2009/0104036 | A1 | | 4/2009 | Fabre |

FOREIGN PATENT DOCUMENTS

| | | |
|---|---|---|
| FR | 2893093 A1 | 5/2007 |
| GB | 1296310 A | 11/1972 |

OTHER PUBLICATIONS

English Abstract for EP1843044A1—Oct. 10, 2007; 1 pg.
English Abstract for FR2893093A1—May 11, 2007; 2 pgs.
European Search Report for Application No. 15195023.5-1610; dated Mar. 22, 2016; 7 pgs.

* cited by examiner

REINFORCED GAS TURBINE ENGINE ROTOR DISK

CROSS-REFERENCE TO RELATED APPLICATIONS

This application is a non-provisional patent application claiming the 35 USC § 119(e) priority benefit of U.S. Provisional Patent Application Ser. No. 62/080,811 filed on Nov. 17, 2014.

FIELD OF THE DISCLOSURE

The present disclosure generally relates to gas turbine engines, and more specifically, relates to structurally-reinforced rotor disks in gas turbine engines.

BACKGROUND

Gas turbine engines, such as those used to provide thrust to an aircraft, are internal combustion engines that use air as the working fluid. In general, gas turbine engines may include a fan section and a core engine located downstream of the fan section. In operation, air may be drawn into the engine and accelerated by the fan section, and a fraction of the indrawn air may be routed through the core engine where the air may be combusted with fuel to provide energy to drive the engine and provide forward thrust to an associated aircraft. In an upstream to downstream order, the core engine may include a compressor section, one or more combustors, a turbine section, and an exhaust nozzle.

The fan section, the compressor section, and the turbine section may each have one or more rotors with rotating airfoils (or blades). The rotor includes a disk having three main sections: 1) a rim supporting the airfoils, 2) a bore radially inboard of the rim, and 3) a web connecting the bore to the rim. In general, the rim may be positioned radially outward of the self-sustaining radius (SSR) of the rotor, while the bore may be positioned radially inward of the SSR. The SSR of the rotor is the radius with respect to the rotational axis of the rotor outside of which the rotor cannot control its own deflection, or sustain itself, under a given rotational loading. The bore may constrain and control stresses in rotor material positioned radially outward of the SSR (primarily the rim), and the web may transfer the bore's restraint to the rim.

Rotor disks in gas turbine engines are often formed from heavy materials, such as metal, and may require significant amounts of material and space to accomplish their structural requirements. The use of integrally bladed rotors (or IBRs), in which the blades are integrally formed with the disk, has led to reductions in part count and weight in some rotor systems. However, IBR designs may still require a disk of significant cross-section and mass, and may take up considerable space in the engine.

In an effort to produce lighter weight and higher strength rotor disks, some prior art systems have introduced reinforcing fibers and composite materials into rotor disks. For example, U.S. Pat. No. 7,811,062 describes the use of ceramic fibers embedded into the metallic material of the bore and the rim of a rotor disk. While effective, current fiber/composite-reinforced disk and IBR designs may be associated with several drawbacks. In particular, some designs may require complex manufacturing processes in which the reinforcing fibers are embedded or integrated into the metallic material of the disk during its manufacture. In addition, other designs may require mechanical fasteners to attach a composite reinforcement to the disk, thereby counteracting any weight reduction with the need for additional parts. Furthermore, it may be difficult to accommodate interfacial stresses between fiber/composite reinforcements and the metal material of the disk due to strength and thermal growth mismatches between metal and composite materials. Thus, there are numerous challenges and limitations with existing art that are to be overcome.

Clearly, there is a need for lighter weight and higher strength rotor disks that take up less space in gas turbine engines.

SUMMARY

In accordance with one aspect of the present disclosure, a structurally-reinforced rotor disk for a gas turbine engine is disclosed. The structurally-reinforced rotor disk may comprise a body including a rim configured to support airfoils, an axially-extending bore disposed radially inward of the rim, and a radially-extending web connecting the rim and the bore. The bore may include an axial outer edge and at least one circumferentially-extending annular recess formed axially between the outer edge and the web. The rotor disk may further comprise an annular ring retained in the annular recess. The annular ring may be formed from a different material than the body of the rotor disk so as to increase a self-sustaining radius of the rotor disk.

In another refinement, the annular ring may be formed from a composite material.

In another refinement, the composite material is an organic matrix composite.

In another refinement, the organic matrix composite may include continuous fibers wound circumferentially through the annular recess.

In another refinement, the continuous filaments may be carbon fibers.

In another refinement, the body of the rotor disk may be formed from a metallic material.

In another refinement, the composite material is a metal matrix composite.

In another refinement, the metal matrix composite includes continuous filaments wound circumferentially through the annular recess.

In another refinement, the annular recess may include radially extending edges, and the radially extending edges may assist in retaining the annular ring in the annular recess.

In another refinement, the annular recess may have a semi-circular shape or a semi-elliptical shape in cross-section.

In another refinement, the bore may include two of the annular recesses each disposed on opposing sides of the web, and the rotor disk may include two of the annular rings each retained by a respective one of the annular recesses.

In another refinement, the rotor disk may be part of an integrally bladed rotor.

In accordance with another aspect of the present disclosure, a gas turbine engine is disclosed. The gas turbine engine may comprise: 1) a fan section, 2) a compressor section downstream of the fan section, 3) a combustor downstream of the compressor section, and 4) a turbine section downstream of the combustor. The gas turbine engine may further comprise a structurally-reinforced rotor disk in at least one of the fan section, the compressor section, and the turbine section. The rotor disk may include a body including a rim supporting an airfoil, an axially-extending bore disposed radially inward of the rim, and a radially-extending web connecting the rim and the bore. The bore may include an axial outer edge and at least one circumferentially-extending annular recess formed axially between the outer edge and the web. The rotor disk may further comprise an annular ring retained in the annular recess. The annular ring may be formed from a different material than the body of the rotor disk so as to increase a self-sustaining radius of the rotor disk.

In another refinement, the body may be formed from a metallic material, and the annular ring may be formed from a composite material.

In another refinement, the composite material is an organic matrix composite.

In another refinement, the organic matrix composite includes continuous filaments wound circumferentially through the annular recess.

In another refinement, the composite material is a metal matrix composite.

In another refinement, the annular recess may include radially extending edges, and the radially extending edges may assist in retaining the annular ring in the annular recess.

In another refinement, the bore may include two of the annular recesses each disposed on opposing sides of the web, and the rotor disk may include two of the annular rings each retained by a respective one of the annular recesses.

In accordance with another aspect of the present disclosure, a method for fabricating a structurally-reinforced rotor disk for a gas turbine engine is disclosed. The method may comprise providing a rotor disk including a rim, an axially-extending bore disposed radially inward of the rim, and a radially-extending web connecting the rim and the bore. The bore may include an axial outer edge and a circumferentially-extending annular recess formed axially between the outer edge and the rim. The method may further comprise winding one or more continuous filaments circumferentially through the annular recess of the bore, and optionally injecting a curable matrix into the annular recess. The method may further comprise curing the matrix to provide an annular ring in the annular recess. The annular ring may structurally reinforce the rotor disk.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with gas turbine engine rotor disks. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
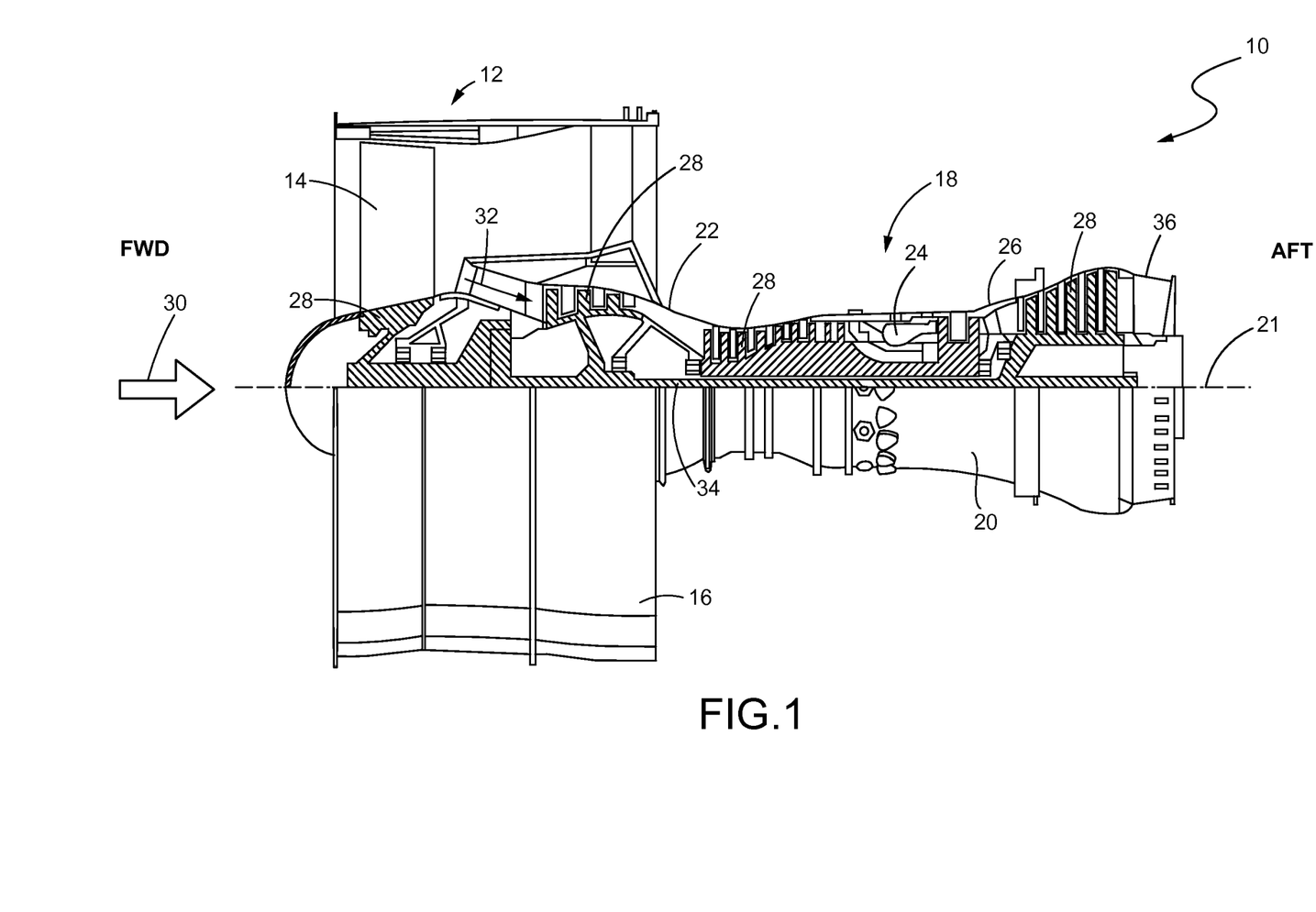
FIG. 1 is a cross-sectional view of a gas turbine engine, constructed in accordance with the present disclosure.

Referring now to the drawings, and with specific reference to FIG. 1, a gas turbine engine 10 is shown. The gas turbine engine 10 may be associated with an aircraft to provide thrust, or it may be used to provide power in other applications. The gas turbine engine 10 includes a fan section 12 having a fan 14 surrounded by a fan case 16, as well as a core engine 18 surrounded by an engine case 20 that is located axially downstream of the fan 14 with respect to an engine centerline 21. In an upstream to downstream direction, the core engine 18 includes: 1) a compressor section 22 which includes a low pressure compressor (LPC) upstream from a high pressure compressor (HPC), 2) one or more combustors 24, and 3) a turbine section 26 which includes a high pressure turbine (HPT) upstream from a low pressure turbine (LPT). In addition, the fan section 12, the compressor section 22, and the turbine section 26 each include one or more rotors 28 having rotatable airfoils or blades.

In operation, air 30 is drawn into the engine 10 and is accelerated by the rotating blades of the fan 14. After passing the fan section 12, a fraction of the indrawn air is routed through a primary flow path 32 defined by the core engine 18. In the primary flow path 32, the air 30 is first compressed and pressurized in the compressor section 22, and it then enters the combustor(s) 24 where it is mixed with fuel and combusted to generate hot combustion gases. The hot combustion gases then expand through and drive the rotation of the turbine section 26 which, in turn, drives the rotation of the compressor section 22 and the fan section 12, as all are mounted on one or more common shafts 34. The gases are then exhausted through an exhaust nozzle 36 to provide forward thrust to an associated aircraft. Although the gas turbine engine 10 is shown in FIG. 1 as a two spool turbofan engine, it will be understood that the engine 10 may have other architectures as well, such as a three-spool turbofan with mid-pressure compressor and turbine sections. Other alternative gas turbine engine arrangements include a multi-stage fan section without a low pressure compressor.

Figure 2:
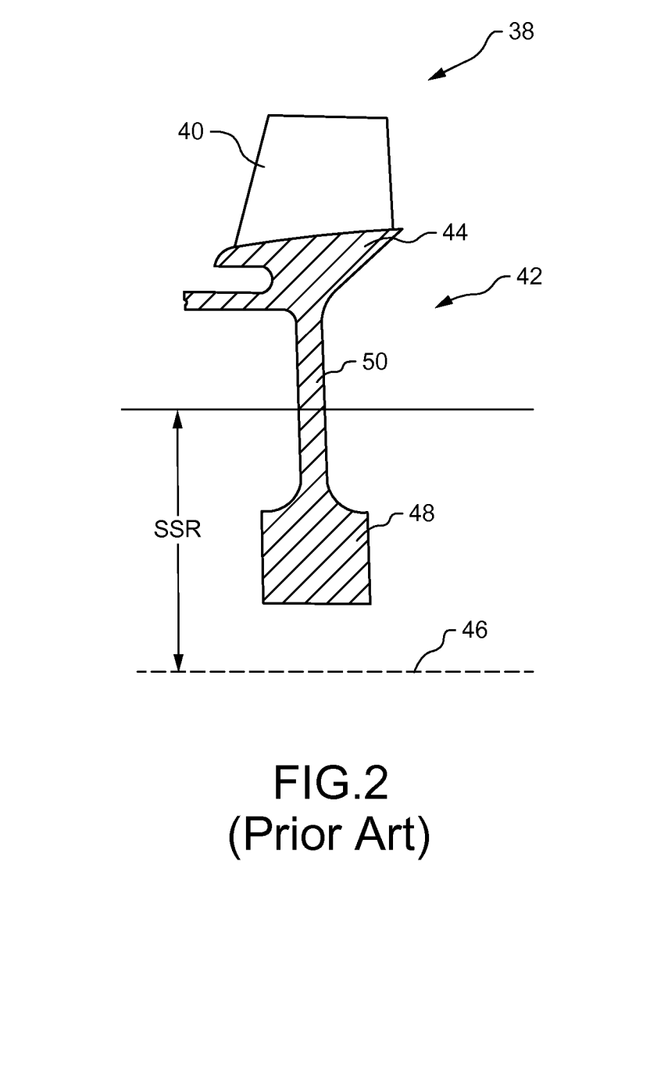
FIG. 2 is a cross-sectional view of a portion of a gas turbine engine rotor above the engine centerline, constructed in accordance with the prior art.

A gas turbine engine rotor 38 in accordance with the prior art is depicted in FIG. 2. In particular, the rotor 38 is symmetrical about the engine centerline such that only a portion of the rotor above the engine centerline is shown. The rotor 38 includes a plurality of airfoils 40 and a disk 42 formed from a metallic material that supports the airfoils 40. Specifically, the disk 42 includes a rim 44 to which the airfoils 40 are mechanically connected or integrally formed. The rim 44 is located radially outward of a self-sustaining radius (SSR) of the rotor 38 with respect to a rotational axis 46 of the rotor 38. In accordance with the present disclosure, the SSR of a rotor is the radius inside of which the rotor can control its own deflection, but outside of which the rotor cannot control its own deflection. Specifically, the SSR of a rotor is proportional to the ultimate strength of the rotor and inversely proportional to the density of the rotor according to relation (1) below, where X is the ultimate strength of the rotor material, G is the gravitational constant, D is the density of the rotor material, and S is the rotational speed of the rotor.

$$SSR \propto SQRT(X \cdot G/D \cdot S^2) \quad (1)$$

The disk 42 further includes a bore 48 located radially inward of the rim 44 and the SSR. The bore 48 is responsible for restraining and controlling the deflection of rotor material that is radially outward of the SSR (e.g., the rim 44). The rotor 38 also includes a web 50 that connects the bore 48 to the rim 44 and transmits the restraint of the bore 48 to the rim 44. In general, the web 50 of the prior art rotor is long in order to position the bore 48 far radially inward of the SSR as the ability of the bore 48 to restrain the rotor 38 is proportional to how far radially inward the bore is with respect to the SSR.

Figure 3:
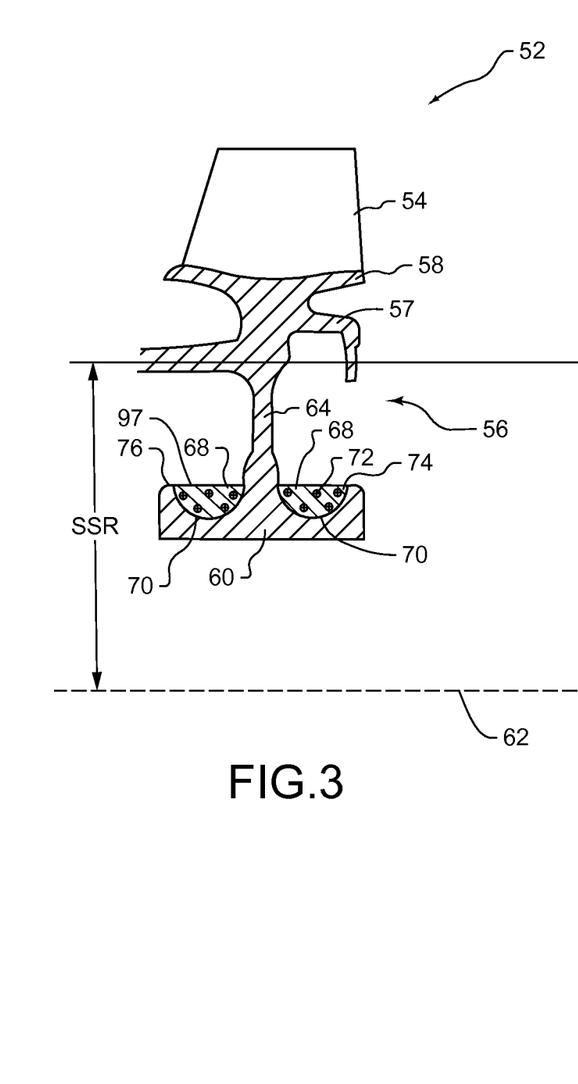
FIG. 3 is a cross-sectional view of a portion of a gas turbine engine rotor above the engine centerline having a structurally-reinforced disk, constructed in accordance with the present disclosure.
Figure 4:
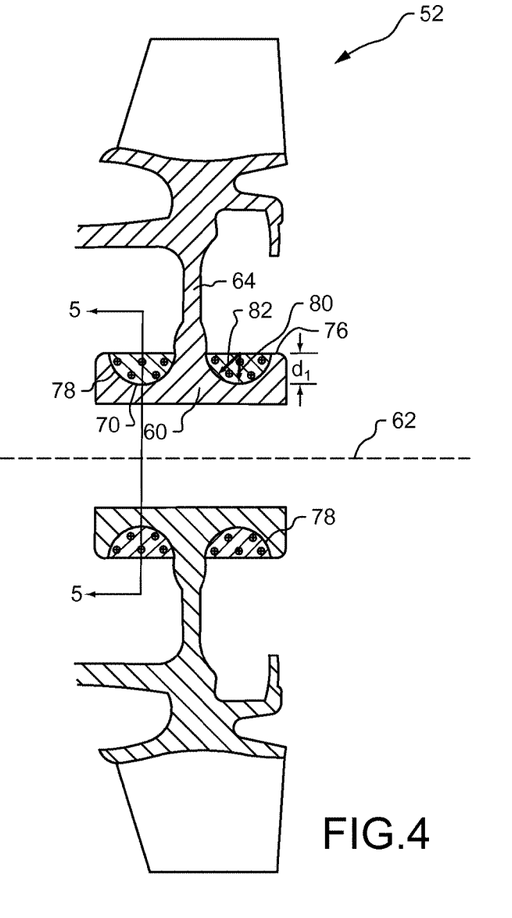
FIG. 4 is a cross-sectional view of the rotor of FIG. 3, constructed in accordance with the present disclosure.
Figure 5:
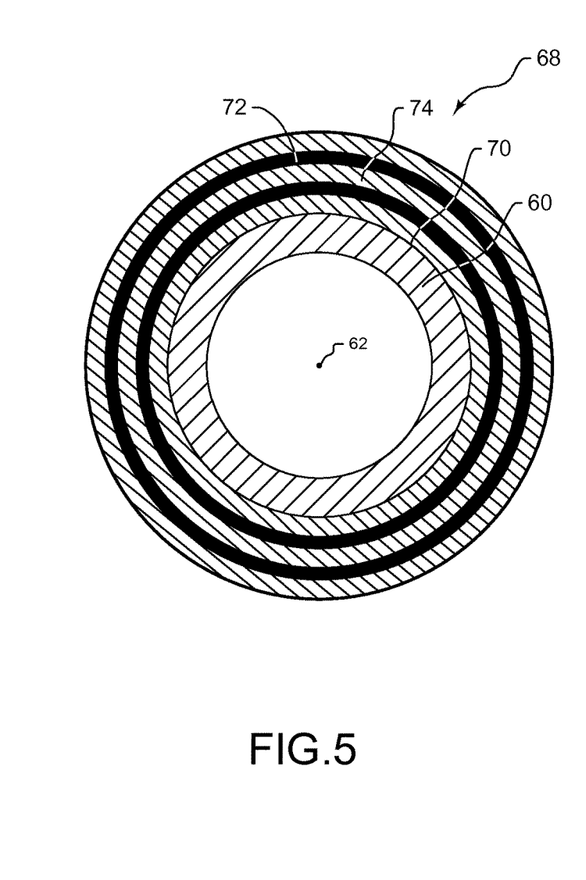
FIG. 5 is a cross-sectional view through the section 5-5 of FIG. 4, depicting a structurally-reinforcing annular ring, constructed in accordance with the present disclosure.

Turning now to FIGS. 3-5, a rotor 52 in accordance with the present disclosure is shown. The rotor 52 may be incorporated in the gas turbine engine 10 of FIG. 1 as one or more of the rotors 28 of the fan section 12, the compressor section 22, and/or the turbine section 26. The rotor 52 includes airfoils 54 and a structurally-reinforced disk 56 that supports the airfoils 54. A body 57 of the disk 56 is formed from a metallic material, such as, but not limited to, nickel, a nickel alloy, titanium, or steel. In addition, the disk 56 has a rim 58 to which the airfoils 54 are mechanically attached as in a classic bladed rotor, or integrally formed if the rotor 52 is an integrally bladed rotor. The disk 56 further includes an axially-extending bore 60 configured to restrain the rotor 52 that is positioned radially inward of the rim 58 with respect to a rotational axis 62 of the rotor 52. The disk 56 also has a radially-extending web 64 that connects the bore 60 to the rim 58 and transmits the restraint of the bore 60 to the rim 58.

Notably, the bore 60 has one or more circumferentially-extending annular rings 68 each positioned in a circumferentially-extending annular recess 70 of the bore 60, as shown. The annular rings 68 are formed from a different material than the body 57 of the disk 56. In accordance with one embodiment of the present disclosure, the annular rings 68 are formed from a composite material which has a higher yield strength and a lower density than the metallic material forming the body 57 of the disk 56. Consequently, the annular rings 68 effectively raise the SSR of the rotor 52/rotor disk 56 of the present disclosure relative to the SSR of the all-metallic rotor disk 42 of the prior art. In accordance with the present disclosure, the term "rotor disk" refers to both the metallic rotor disk 42 and the annular rings 68. In some cases, the annular rings 68 may effectively increase the SSR of the rotor disk 56 relative to the prior art rotor disk 42 by several orders of magnitude or more. The increase of the SSR of the rotor disk 56 allows the bore 60 to be positioned further radially outward of the rotational axis 62 compared to the prior art rotor disk 42, while providing at least an equivalent or comparable rotor restraint. Accordingly, the web 64 and the bore 60 of the rotor disk 56 of the present disclosure may be radially shorter and formed of significantly less material than the all-metallic rotor disk of FIG. 2. Consequently, the rotor disk 56 may be lighter in weight and may free up a significant amount of space in the gas turbine engine for the placement other components, if desired.

The annular ring 68 extends circumferentially through the annular recess 70 of the bore 60 to strengthen the rotor 52 in the circumferential direction, as best shown in FIG. 5. The composite material of the annular ring 68 includes filaments 72 embedded in a matrix 74. The filaments 72 are continuous filaments having a filament length to diameter ratio of 200 or more. In addition, the filaments 72 are non-woven and are wound circumferentially through the annular recess 70 and about the rotational axis 62, as shown in FIG. 5. As one possibility, the composite material is an organic matrix composite (O.M.C.) and the matrix 74 is a cured organic resin matrix. If the composite material is an O.M.C., the filaments 72 may be organic fibers such as carbon fibers, although many other types of fibers may also be used. Alternatively, the composite material is a metal matrix composite (M.M.C.) in which case the matrix 74 is a metallic matrix. However, those skilled in the art will understand that other types of filaments and composite materials may be used such as, but not limited to, woven fiber fabrics, metallic wire filaments, ceramic filaments, ceramic matrix composites, and hybrid composites composed of at least three different types of materials.

With reference to FIG. 4, the configuration of the bore 60 and the annular recess 70 will now be described in further detail. The bore 60 has an axial outer edge 76 that is the surface of the bore 60 that is the furthest radially outward of the rotational axis 62. In particular, the annular recess 70 is formed along the outer edge 76 and axially between the outer edge 76 and the web 64. In one aspect of the present disclosure, the bore 60 has two annular recesses 70, with each annular recess 70 disposed on opposing sides of the web 64, as shown. Furthermore, the annular recess 70 has radially extending edges 78 that assist in retaining the annular ring 68 in the recess 70, such that the ring 68 may be retained in the recess 70 without the need for mechanical fasteners. In this regard, the bore 60 has a shape that is axial wide enough along the outer edge 76 to provide sufficient material axially forward of or axially aft of the edges 78 to assist in retaining the annular ring 68.

The dimensions and cross-sectional shape of the annular recess 70 is configured to accommodate a shear stress 80 and/or a bending stress 82 that may be imposed on the metallic material of the bore 60 by the annular ring 68. The shear stress 80 and the bending stress 82 may result, in part, from the lower thermal expansion coefficient of the composite material of the ring 68 compared to the metallic material of the bore 60. Specifically, the ring 68 may expand to a lesser degree than the bore 60 in response to thermal and/or structural loads, thereby imposing possible stresses 80, 82 on the bore 60. To accommodate the shear stress 80, the depth ($d_1$) of the annular recess 70 may be designed to ensure that the metallic bore material beneath the recess 70 is thick enough to withstand the shear stress 80. In addition, the shape of the radially extending edges 78 may be designed to ensure that the bore 60 is capable of withstanding the bending stress 82 imposed by the ring 68. In one aspect of the present disclosure, the annular recess 70 has a semi-circular shape or a semi-elliptical shape in cross-section with the radially extending edges 78 curving toward the outer edge 76 to accommodate the bending stress 82, as shown in FIG. 4. However, it will be appreciated that the cross-sectional shape of the annular recess may vary depending on a number of factors such as the type of composite material used and the design and operating conditions (e.g., temperature, rotational speed, etc.) of the rotor 52.

Figure 6:
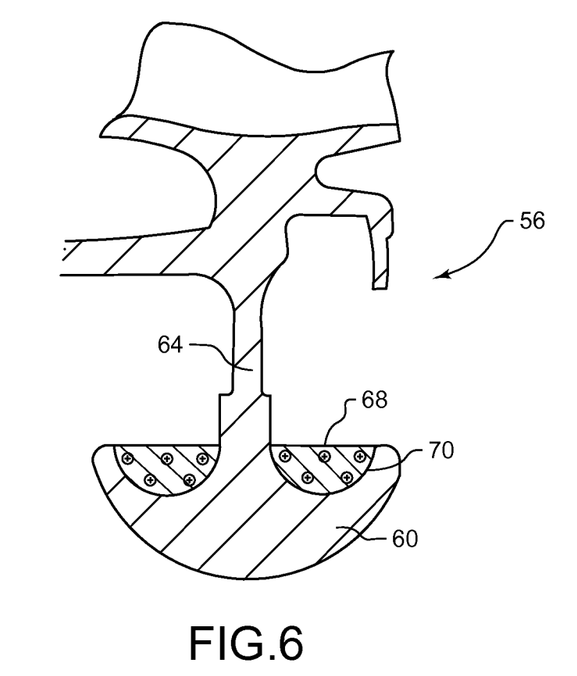
FIG. 6 is a cross-sectional view of a gas turbine rotor similar to FIG. 3, but having an anchor-shaped bore, constructed in accordance with the present disclosure.

In addition, the overall shape of the bore 60 may also be designed to suitably handle shear and bending stresses applied by the ring 68. In one aspect of the present disclosure, the bore 60 has a rectangular shape in cross-section as shown in FIGS. 3-4. In another aspect, the bore 60 has an anchor-shape in cross-section as shown in FIG. 6. However, it will be appreciated that various other cross-sectional bore shapes may be used depending on various factors such as the type of composite material used, as well as the design and operating conditions (e.g., temperature, rotational speed, etc.) of the rotor 52.

Figure 7:
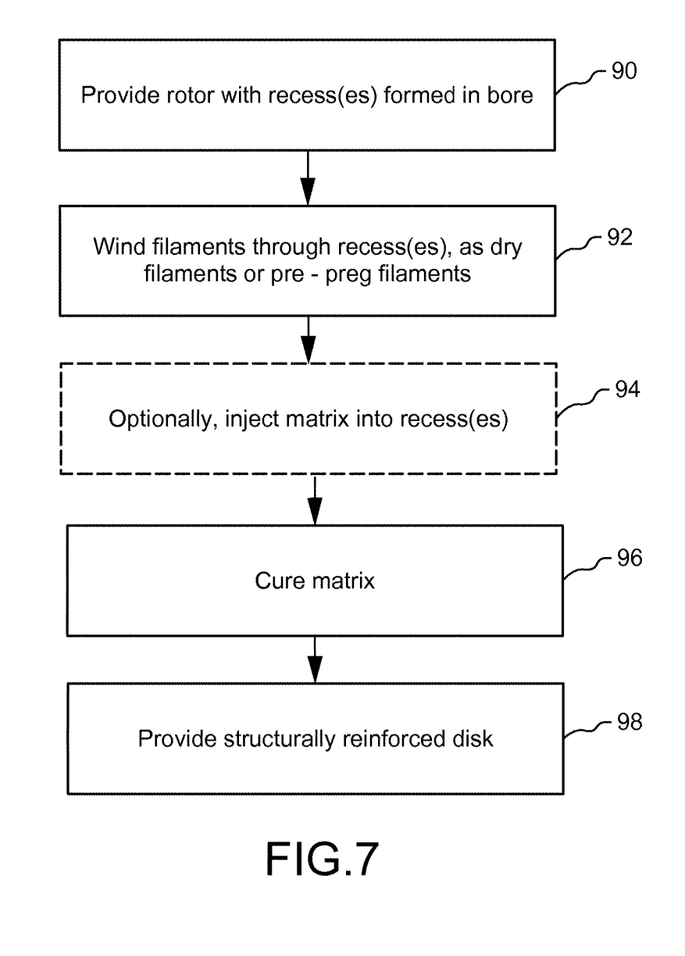
FIG. 7 is a flowchart illustrating a sample sequence of steps that may be used to fabricate the structurally-reinforced disk of FIG. 3, constructed in accordance with a method of the present disclosure.

A series of steps which may be used to fabricate the reinforced rotor disk 56 of the present disclosure are shown in FIG. 7. Beginning with a first step 90, the rotor 52 or disk 56 is provided with one or more annular recesses formed along the outer edge 76 of the bore 60. According to a next step 92, the filaments 72 are then wound through each of the recesses 70 by wrapping the filaments 72 circumferentially about the rotational axis 62 to build up the filament material in each recess 70 to a desired level. The step 92 may be achieved by wrapping dry filaments through the recess 70, or by wrapping pre-preg layers of the filaments through the recess 70 as described above. If dry filaments are used, an uncured resin matrix may then be injected into the recess 70 to embed the filaments 72 in the resin according to an optional step 94. In either case, the resin is then cured in place using the recess 70 as a mold to shape the annular ring 68 according to a next step 96, as shown. In some cases, an additional mold may also be used to shape a top surface 97 of the ring 68 as well. The structurally-reinforced disk 56 is then provided according to a next step 98.

INDUSTRIAL APPLICABILITY

In general, it can therefore be seen that the technology disclosed herein has industrial applicability in a variety of settings including, but not limited to, gas turbine engines. The structurally-reinforced rotor disk of the present disclosure may have a significantly increased SSR than comparable all-metallic rotor systems of the prior art due to the higher strength and lower density provided by the composite material. The increased SSR may permit the web to be shortened radially and the bore to be positioned further radially outward than comparable all-metallic rotor designs of the prior art, with minimal impacts on rotor performance. Thus, the smaller and lighter weight reinforced rotor disk disclosed herein may free up space in the gas turbine engine for the placement of other components such as gears or hubs, as well as lead to valuable improvements in engine fuel efficiency. In addition, the bore annular recess for holding the structurally-reinforcing annular ring is designed to retain the ring without the need for additional mechanical fasteners which could otherwise counteract some of the weight reduction provided by the smaller rotor disk. Even further, the reinforced rotor disk disclosed herein may have a reduced tendency to expand under thermal or structural load due to the lower coefficient of thermal expansion of the composite material of the annular ring. The reduced tendency to expand may improve the ability to control and maintain tight clearance between the rotor blades and abradable material radially outside of the tips of the blades, thereby minimizing leakage and providing additional improvements in engine efficiency. It is expected that the technology disclosed herein may find wide industrial applicability in a wide range of areas such as, but not limited to, aerospace technologies.

What is claimed is:

1. A structurally-reinforced rotor disk for a gas turbine engine, comprising:
    a body including a rim configured to support airfoils, an axially-extending bore disposed radially inward of the rim, and a radially-extending web connecting the rim and the bore;
    the bore including an axial outer edge and at least one circumferentially-extending annular recess formed axially between the outer edge and the web; and
    an annular ring retained in the annular recess, the annular ring being formed from a different material than the body of the rotor disk so as to increase a self-sustaining radius of the rotor disk.

2. The structurally-reinforced rotor disk of claim 1, wherein the annular ring is formed from a composite material.

3. The structurally-reinforced rotor disk of claim 2, wherein the composite material is an organic matrix composite.

4. The structurally-reinforced rotor disk of claim 3, wherein the organic matrix composite includes continuous filaments wound circumferentially through the annular recess.

5. The structurally-reinforced rotor disk of claim 4, wherein the continuous filaments are carbon fibers.

6. The structurally-reinforced rotor disk of claim 4, wherein the body is formed from a metallic material.

7. The structurally-reinforced rotor disk of claim 2, wherein the composite material is a metal matrix composite.

8. The structurally-reinforced rotor disk of claim 7, wherein the metal matrix composite includes continuous filaments wound circumferentially through the annular recess.

9. The structurally-reinforced rotor disk of claim 1, wherein the annular recess includes radially extending edges, and wherein the radially extending edges assist in retaining the annular ring in the annular recess.

10. The structurally-reinforced rotor disk of claim 9, wherein the annular recess has a semi-circular shape or a semi-elliptical shape in cross-section.

11. The structurally-reinforced rotor disk of claim 10, wherein the bore includes two of the annular recesses each disposed on opposing sides of the web, and wherein the rotor disk further includes two of the annular rings each retained by a respective one of the annular recesses.

12. The structurally-reinforced rotor disk of claim 1, wherein the rotor disk is part of an integrally bladed rotor.

13. A gas turbine engine, comprising:
    a fan section;
    a compressor section downstream of the fan section;
    a combustor downstream of the compressor section;
    a turbine section downstream of the combustor; and
    a structurally-reinforced rotor disk in at least one of the fan section, the compressor section, and the turbine section, the rotor disk including
        a body including a rim supporting an airfoil, an axially-extending bore disposed radially inward of the rim, and a radially-extending web connecting the rim and the bore,
        the bore including an axial outer edge and a circumferentially-extending annular recess formed axially between the outer edge and the web, and
        an annular ring retained in the annular recess, the annular ring being formed from a different material than the body of the rotor disk so as to increase a self-sustaining radius of the rotor disk.

14. The gas turbine engine of claim 13, wherein the body is formed from a metallic material, and wherein the annular ring is formed from a composite material.

15. The gas turbine engine of claim 14, wherein the composite material is an organic matrix composite.

16. The gas turbine engine of claim 15, wherein the organic matrix composite includes continuous filaments wound circumferentially through the annular recess.

17. The gas turbine engine of claim 14, wherein the composite material is a metal matrix composite.

18. The gas turbine engine of claim 13, wherein the annular recess includes radially extending edges, and wherein the radially extending edges assist in retaining the annular ring in the annular recess.

19. The gas turbine engine of claim 18, wherein the bore includes two of the annular recesses each disposed on opposing sides of the web, and wherein the rotor disk further includes two of the annular rings each retained by a respective one of the annular recesses.

20. A method for fabricating a structurally-reinforced rotor disk for a gas turbine engine, comprising:
providing a rotor disk including a rim, an axially-extending bore disposed radially inward of the rim, and a radially-extending web connecting the rim and the bore, the bore including an axial outer edge and a circumferentially-extending annular recess formed axially between the outer edge and the rim;
winding one or more continuous filaments circumferentially through the annular recess of the bore;
optionally, injecting a curable matrix into the annular recess; and
curing the matrix to provide an annular ring in the annular recess, the annular ring structurally reinforcing the rotor disk.

* * * * *